United States Patent

[11] 3,626,246

[72] Inventor Masaru Higuchi
 Osaka, Japan
[21] Appl. No. 823,440
[22] Filed May 9, 1969
[45] Patented Dec. 7, 1971
[73] Assignee West Electric Co., Ltd.
 Osaka, Japan
[32] Priority May 15, 1968
[33] Japan
[31] 43/33304

[54] STROBE DEVICE FOR PHOTOGRAPHY
 10 Claims, 3 Drawing Figs.
[52] U.S. Cl................................................ 315/241,
 315/241 P, 315/151, 320/1
[51] Int. Cl................................................ H05b 37/00
[50] Field of Search.......................................... 315/241 P,
 241, 151; 320/1

[56] References Cited
 UNITED STATES PATENTS
2,393,316 1/1946 Edgerton...................... 315/241 P
2,624,831 1/1953 Farber........................... 315/241 P
3,519,879 7/1970 Ogawa........................... 315/241 X
 FOREIGN PATENTS
973,335 1/1960 Germany....................... 315/241 P
1,051,404 2/1959 Germany....................... 315/241 P
 OTHER REFERENCES
" Double Pulsing Boosts Flash Tube Performance," by J. H. Gonez and S. W. Park, Microwave, April, 1965.

Primary Examiner—John Kominski
Assistant Examiner—Lawrence J. Dahl
Attorney—Stevens, Davis, Miller and Mosher ABSTRACT: A strobe device for photography, wherein there is provided a main discharge capacitor and light intensifying capacitor, that portion of the light resulting from the light emission of the main discharge capacitor which has been reflected by an object to be picked up is received by a photosensitive element, a silicon controlled rectifier is controlled by the output energy of the photoconductive element, and charges at the light-intensifying capacitor are discharged to a xenon discharge tube as occasion demands.

PATENTED DEC 7 1971

3,626,246

INVENTOR

MASARU HIGUCHI

BY Stevens, Davis, Miller & Mosher

ATTORNEYS

STROBE DEVICE FOR PHOTOGRAPHY

This invention relates to a strobe device for photography, and more particularly it pertains to such devices of the automatic output light switching type wherein the output light is automatically switched in accordance with the distance therefrom to an object to be picked up and the reflection factor of the object.

In an attempt to photographically pick up an object by the use of a strobe device for photography, it has heretofore been required that the iris of a camera be adjusted in accordance with the distance therefrom to the object and the reflection factor of the object all the time.

Accordingly, it is an object of the present invention to provide a strobe device for photography, which is so designed that when the quantity of light is less than the required one, it is automatically increased, thereby eliminating the necessity for the adjustment of the camera iris.

Other objects, features and advantages of the present invention will become apparent from the following description taken in conjunction with the accompanying drawings, in which.

Figure 1:
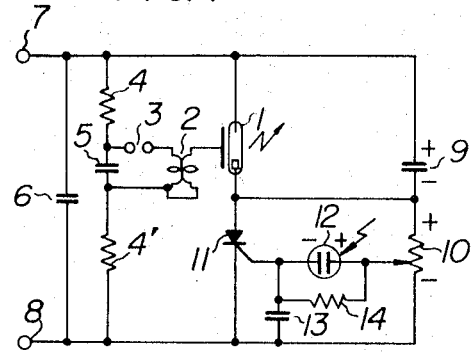
FIG. 1 is a circuit diagram showing the basic form of strobe device for photography according to an embodiment of the present invention.

The construction of the present invention will now be described with reference to FIG. 1, the main portion of which is constituted by a circuit comprising a xenon discharge tube 1 main discharge capacitor 9, trigger transformer 2, synchronized terminals 3 to be connected with the contact of a camera, resistors 4 and 4' for a trigger energy supplying circuit, trigger capacitor 5 and light intensifying capacitor 6, wherein a variable resistor 10 and silicon controlled rectifier 11 (referred to as SCR hereinafter) are connected in a series loop with the circuit of the xenon discharge tube 1 and capacitor 9, and a photocell 12 and a capacitor 13 for producing an integrating action are connected with the gate of the SCR 11.

Figure 2:
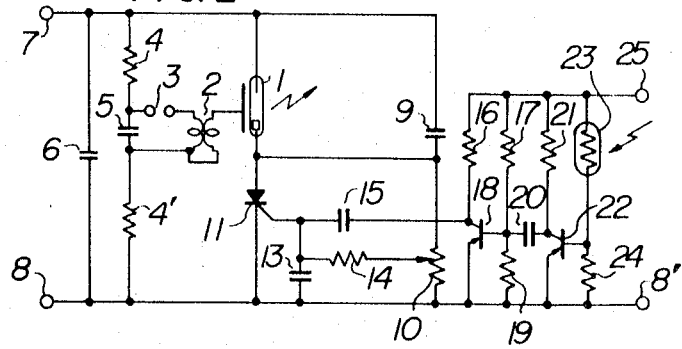
FIG. 2 is a circuit diagram showing a concrete example of the device.

FIG. 2 shows a circuit arrangement using a CdS or photoconductor or the like as the light receiving element wherein a voltage substantially identical with that occurring in the circuit constituted by the photocell 12 and capacitor 13 shown in FIG. 1 is obtained across a resistor 14. The circuit arrangement also includes a light receiving portion comprising resistors 16, 17, 19, 21 and 24, coupling capacitors 15 and 20, transistors 18 and 22, and photoconductive element 23 formed by Cds or the like.

Figure 3:
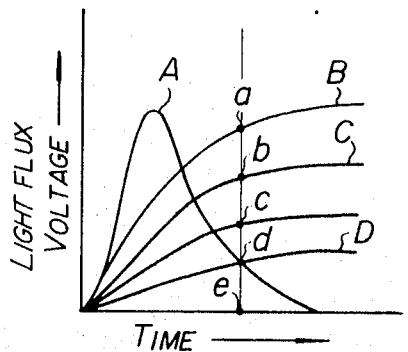
FIG. 3 is a view illustrating variations with time in strobe light and voltages at various portions in the device.

In operation, the xenon discharge tube 1 is made to emit light by closing the camera contact, as is well known in the art. Then, energy for the light emission is supplied by the capacitor 9. The light intensifying capacitor 6 is connected with a power source by terminals 7 and 8. Thus, by closing the synchroscope contacts 3, the charges at the capacitor 9 are discharged to the xenon discharge tube 1 to start light emission, and in the course of the discharge, a voltage difference occurs between the capacitor 9 and the light increasing capacitor 6. This voltage difference appears as a voltage drop across the variable resistor 10, and it is divided by the tap of the variable resistor and then applied as a positive bias voltage of the gate of the SCR 11 through the resistor 14 to thereby render the SCR 11 conductive. Thus, the energy stored in the light-intensifying capacitor 6 is permitted to flow into the xenon discharge tube 1. It is to be noted here that the output polarity of the photocell 12 is made opposite to that of this voltage. Therefore, when light is projected onto the photocell 12, a reverse voltage is produced which is cancelled out with the aforementioned positive bias voltage so that no voltage is imparted to the gate of the SCR 11 so that the latter is not rendered conductive. Hence, the xenon discharge tube 1 is made to emit light only by the energy stored in the capacitor 9. The capacitor 13 is provided for the purpose of integrating the output of the photocell 12 which is available when the light of the xenon tube which varies as indicated at A in FIG. 3 is projected onto the photocell after having been reflected by the object to be photographed. In FIG. 3, C indicates the case where the distance between the device and the object is so short that a large quantity of light is reflected by the object, D shows the case where the distance between the device and the object is so long that only a small quantity of light is reflected by the object, and B indicates the voltage occurring at the midpoint of the variable resistor 10. The SCR 11 is rendered conductive at a time during the ignition of the xenon discharge tube 1. On the assumption that the SCR is turned on at a point $a$ in FIG. 3, for example, then the positive bias voltage applied to the gate of the SCR 11 is represented by $\overline{ae}$. However, by designing the circuit so that the SCR is rendered conductive by a voltage difference as represented by $\overline{AC}$, the SCR is turned on even in the case of D where the reflected light input is small, because in that case there occurs such a voltage difference as represented by $\overline{ad}$ which is greater than $\overline{AC}$. Thus, the change on capacitor 6 is discharged through the xenon discharge tube 1 so that shortage of the light quantity at the object can be automatically compensated. In the case of C where the reflected light input is great, there occurs a voltage difference as represented by $\overline{ab}$ which is smaller than $\overline{AC}$ so that the SCR 11 is not turned on so as to prevent the light-intensifying capacitor 6 from being discharged. By selecting the bias voltage for the SCR by adjusting the variable resistor 10 as described above, the quantity of light can be automatically controlled in accordance with the intensity of reflected light. Furthermore, the device is adapted to be operated only by the light emanating from the xenon discharge tube 1 which has been reflected by the object to be picked up and not by any other stroboscopic light. Thus, it is possible to prevent operational errors.

What is claimed is:

1. A strobe device for photography, comprising, a pair of power supply terminals; a first capacitor connected across said pair of terminals; a series circuit of a xenon discharge tube and a silicon control rectifier connected across said pair of terminals; a trigger circuit connected to said xenon discharge tube; a series circuit of a second capacitor and a resistor connected across said pair of terminals; and means controlling the discharge of said first capacitor in response to the quantity of light received by a photosensitive element to an intermediate tap on said resistor and to the control gate of said rectifier, wherein said photosensitive element has a reverse polarity with respect to the voltage on said tap, to thereby control current flow through said silicon control rectifier.

2. A strobe device according to claim 1, further comprising means imparting a voltage difference between said second capacitor and said first capacitor subsequent to the light emission by said second capacitor through said tube, including a further resistor connected between said control gate and said tap.

3. A strobe device according to claim 1, wherein said resistor is a variable resistor and said tap is an adjustable tap.

4. A strobe device according to claim 1, further comprising means integrating the output of said photosensitive element, including a capacitor connected to the output of said photosensitive element.

5. A strobe device according to claim 1, further comprising amplifying means operatively connected between the output of said photosensitive element and said control gate.

6. A strobe device for photography, comprising: a) a pair of power supply terminals b) a first series circuit of a xenon discharge tube having a trigger electrode and a silicon control rectifier having a gate electrode; c) a second series circuit of a first light emitting capacitor and a variable resistance means having an adjustable intermediate tap; d) a second capacitor for intensifying light emission from said capacitor; e) means connecting said first series circuit, said second series circuit and said second capacitor, respectively, in parallel between said pair of power supply terminals; f) means connecting a junction point of said first capacitor and said resistance means to a junction point of said xenon discharge tube and said silicon control rectifier; g) means generating a voltage responsive to light discharged from said discharge tube and reflected from an object illuminated by said discharge light, said voltage generating means being connected between said gate electrode and said movable tap such that said voltage is superimposed on a voltage drop across said resistance means and in the opposite polarity therewith to thereby control current flow through said rectifier; h) and switch means connected between said trigger electrode and said power supply terminals for controlling triggering of said trigger electrode.

7. A strobe device for photography as defined in claim 6, wherein said voltage generating means comprises a parallel circuit of a photo cell and a resistor.

8. A strobe device for photography as defined in claim 7 further comprising a third capacitor connected between said gate electrode and a cathode of said silicon control rectifier.

9. A strobe device for photography as defined in claim 6, wherein said voltage generating means comprises a transistor and photoconductive means connected to said transistor for generating a voltage at one electrode of said transistor in response to a variation in resistance in said photoconductive means.

10. A strobe device as defined in claim 9, further comprising a third capacitor connected between said gate electrode and a cathode of said silicon control rectifier.

* * * * *